Sept. 3, 1963  R. N. ABILD  3,102,388
PRESSURE FED PROPELLANT SYSTEM FOR STORABLE LIQUID ROCKET
Filed June 30, 1959  3 Sheets-Sheet 1

FIG. 1

INVENTOR
ROBERT N. ABILD
BY
ATTORNEY

Sept. 3, 1963 R. N. ABILD 3,102,388
PRESSURE FED PROPELLANT SYSTEM FOR STORABLE LIQUID ROCKET
Filed June 30, 1959 3 Sheets-Sheet 2

INVENTOR
ROBERT N. ABILD
BY
ATTORNEY

Sept. 3, 1963   R. N. ABILD   3,102,388
PRESSURE FED PROPELLANT SYSTEM FOR STORABLE LIQUID ROCKET
Filed June 30, 1959   3 Sheets-Sheet 3

INVENTOR
ROBERT N. ABILD
BY *[signature]*
ATTORNEY

United States Patent Office 3,102,388
Patented Sept. 3, 1963

3,102,388
PRESSURE FED PROPELLANT SYSTEM FOR
STORABLE LIQUID ROCKET
Robert N. Abild, New Britain, Conn., assignor to United
Aircraft Corporation, East Hartford, Conn., a corporation of Delaware
Filed June 30, 1959, Ser. No. 824,131
4 Claims. (Cl. 60—35.6)

This invention relates to liquid rocket engines, more particularly, to the propellant flow and control system for a storable rocket.

An object of this invention is to provide an improved propellant flow and control system for a rocket which is stored in place for a period of years, filled with propellants, and ready to be instantly fired.

Another object of the invention is to provide an improved pressure-fed propellant system for the engine of a storable rocket.

Other objects and advantages will be apparent from the following specification and claims, and from the accompanying drawings which illustrate embodiments of the invention.

In the drawings:

FIG. 1 is a schematic diagram of the propellant flow and control system of my invention.

Figure 2:
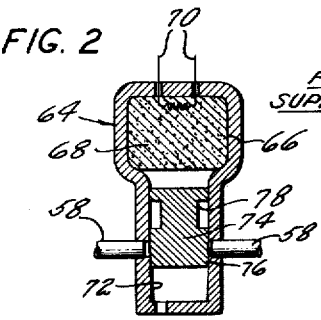
FIG. 2 is an enlarged section view of the start squib valve.

The rocket engine of FIG. 1, uses storable liquid propellants and is designed to be in a constant state of readiness to allow a single start and stop. The engine is composed of a single pressure fed fuel tank, a single pressure fed oxidizer tank, a cluster of four thrust chambers each of which is hinged for steering purposes and has a fuel cooled combustion chamber and nozzle, a separate pressurizing system for each propellant tank, auxiliary propellants for the pressurizing system, a control system calibrated to provide equal chamber pressure in each thrust chamber, a pressure responsive control system to provide the desired thrust level, and a pressure responsive control system to assure that the main propellants are used in the desired proportions. Simplicity and reliability are obtained through the use of mechanical and pneumatical systems insofar as possible and by requiring a minimum amount of storage maintenance.

Receipt of an electrical start signal permits high pressure helium to flow through a pressure regulator into the auxiliary propellant tanks. The pressure fed auxiliary propellants are mixed and burned in two separate gas generators, the combustion products of which separately pressurize the main propellant tanks. The start signal also valves the pressure regulated helium to open both main propellant valves permitting the pressure fed main propellants to flow into the clustered thrust chambers. Seperate main tank pressure regulators regulate the amount of auxiliary propellants flowing to each gas generator to provide the required main propellant tank pressurization to maintain a predetermined pressure in each propellant conduit.

In flight, thrust termination occurs when either propellant tank becomes empty, and provision is made for terminating thrust for a ground abort or test termination. The ground abort or test termination is accomplished by an electrical signal which changes the porting of high pressure helium so as to close both main propellant valves and simultaneously helium purge both propellant systems downstream of the main propellant valves.

Flow checking of each thrust chamber and test firing of the four thrust chamber cluster is used to calibrate the system. Orifice plates are added to both propellant conduits at each thrust chamber so that at a predetermined conduit pressure each thrust chamber produces a predetermined sea level thrust at a predetermined mixture ratio.

After calibration of the engine, the system is prepared for storage. Following purging, the oxidizer tank is filled with an oxidizer such as nitrogen tetroxide and the fuel tank is filled with a fuel such as hydrazine. The tank overflow vents establish the proper amounts of these propellants in their tanks. Both of the tanks then are pressurized with nitrogen. The main propellant tanks are sealed off from the thrust chamber cluster by diaphragm sealed main propellant valves. The auxiliary propellant tanks are filled with an oxidizer such as nitrogen tetroxide and a fuel such as anhydrous ammonia and are pressurized by their own respective vapors and sealed by burst diaphragms. A slug of hydrazine, contained between burst diaphragms, is placed in the fuel line to each gas generator. The high pressure helium tank is filled and sealed by a squib type valve. Water is added to the fuel system downstream of the main fuel propellant valve. During storage, servicing of the helium and water supplies would be required to make up for helium loss and water evaporation, unless means is provided to prevent the latter. Because of the reliability of mechanical and pneumatic systems, a minimum of maintenance on the engine during storage is anticipated.

Referring to FIG. 1 of the drawings in detail, main propellant container 10 is shown. The container is divided by partition 12 into upper tank 14 which contains a fuel and lower tank 16 which contains an oxidizer.

The bottom of fuel tank 14 is connected by conduit 18, which extends downward through the center of propellant container 10, to distribution conduit 20. The distribution conduit in turn is connected to a plurality of hinged thrust chambers, but only one connection will be described for purposes of simplicity. Branch conduit 22 extends from distribution conduit 20 to jacket 24 surrounding a portion of thrust chamber 26. The thrust chamber includes combustion chamber 28 and thrust nozzle 30. Fuel in the jacket flows to manifold 32 at the upstream end of combustion chamber 28 and from here it is injected through a plurality of jets 34 into the combustion chamber.

The fuel conduit includes fill and drain connection 36 located in conduit 18 immediately below the propellant tank, diaphragm sealed butterfly valve 38 located in conduit 18 below the fill and drain connection, and calibrated orifice plate 40 located in branch conduit 22 immediately upstream of jacket 24.

The bottom of oxidizer tank 16 is connected by conduit 42 to distribution conduit 44 which is connected to each of the thrust chambers as is the fuel conduit. Branch conduit 46 extends from distribution conduit 44 to manifold 48 adjacent fuel manifold 32 at the upstream end of combustion chamber 28. Oxidizer from the manifold is injected into the combustion chamber through a plurality of openings surrounding fuel jets 34.

The oxidizer conduit includes fill and drain connection 50 located in conduit 42 immediately below the propellant tank, diaphragm sealed butterfly valve 52 located in conduit 42 below the fill and drain connection, and calibrated orifice plate 54 located in branch conduit 46 at the entrance to manifold 48. Calibrated orifice plates 40 and 54 are provided in each of the fuel and oxidizer conduits adjacent the thrust chambers to balance the flow between the several thrust chambers.

Helium contained in tank 56 is used for starting purposes and during flight. The helium tank is connected by pipe 58 to auxiliary oxidizer tank 60 and auxiliary fuel tank 62. Start squib valve 64 is located in pipe 58 adjacent the helium tank. Prior to actuation this squib valve is closed, restraining the helium in the tank. As shown in FIG. 2, the squib valve includes chamber 66 containing solid propellant 68. Electrical circuit 70 is connected to the solid propellant for firing it. Cylinder 72 below the propellant chamber contains piston 74, the piston being held in an upper position by virtue of a tight fit in the cylinder. The position of the piston relative to conduit 58 prior to firing is such that the conduit is blocked by land 76. However, when the propellant is fired by current passing through circuit 70 the piston is forced down by the propellant combustion gas pressure and maintained in a downward position in the cylinder by virtue of an interference fit between the piston and the cylinder wall. In this position piston groove 78 aligns with the conduit and permits the flow of helium through the squib valve.

Figure 3:
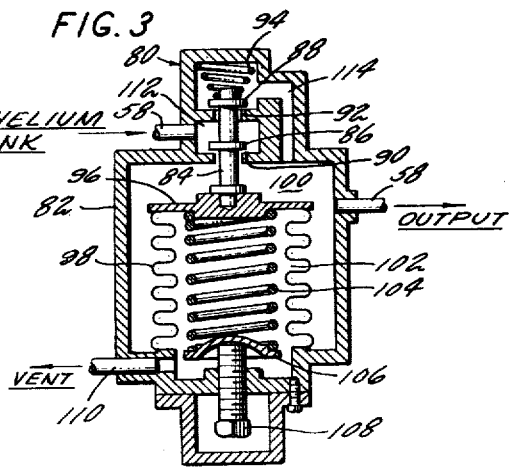
FIG. 3 is an enlarged section view of the helium pressure regulator.

Downstream of the start squib valve in pipe 58 is helium pressure regulator 80 which acts to maintain a constant pressure of the helium on the propellants in auxiliary tanks 60 and 62. As shown in FIG. 3, the regulator includes casing 82 having double seated valve 84 therein. The valve includes a pair of valve faces 86 and 88 which cooperate with seats 90 and 92, respectively, on the regulator casing to control valve area. The valve is loaded in a downward direction by spring 94 located between the upper end of the valve and casing 82, and the lower end of the valve is connected to bellows end plate 96. Bellows 98 is connected to the end plate and to the regulator casing, and together with the end plate defines chamber 100 externally thereof and chamber 102 internally thereof. Spring 104 within chamber 102 is mounted between end plate 96 and adjustable plate 106 and loads valve 84 in an upward direction. The position of plate 106 can be manually adjusted by bolt 108 to regulate the loading on valve 84 and determine the helium pressure in pipe 58. Chamber 100 is connected to a portion of pipe 58 and chamber 102 is connected to vent 110.

Helium in pipe 58 is admitted to chamber 112 in the helium pressure regulator. From here the helium flows through the opening defined by valve face 88 and seat 92 and through passage 114 to chamber 100, and it also flows through the opening defined by valve face 86 and seat 90 to chamber 100. The helium then flows from chamber 100 into a downstream portion of pipe 58.

Figure 4:
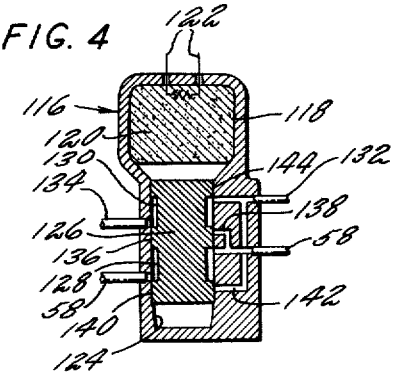
FIG. 4 is an enlarged section view of the stop squib valve.

Stop squib valve 116 is located in pipe 58 downstream of helium pressure regulator 80. As shown in FIG. 4, the stop squib valve includes chamber 118 containing solid propellant 120. Electrical circuit 122 is connected to the solid propellant for firing it. Cylinder 124 below the propellant chamber contains piston 126, the piston being held in an upper position by virtue of a tight fit in the cylinder. When propellant 120 is fired by current passing through circuit 122 the piston is forced down by the propellant combustion gas pressure and maintained in a downward position in cylinder 124 by virtue of an interference fit between the piston and the cylinder wall.

Piston 126 is surrounded by grooves 128 and 130, and in its upper or unfired position groove 128 provides connection between the upstream and downstream portions of pipe 58. At the same time groove 130 connects pipe 132 and vent 134. In this position of the piston, land 136 covers the opening to passage 138 connected to pipe 58 and land 140 covers the opening to passage 142 connected to pipe 132. In the lower or fired position of the piston, land 144 at the top of the piston blocks the opening into pipe 132 and land 136 blocks the opening into pipe 58. Groove 128, however, provides connection between the inlet portion of pipe 58, passage 142 and pipe 132; and groove 130 provides connection between the outlet portion of pipe 58 and connected passage 138 and vent 134.

Downstream of stop squib valve 116, pipe 58 is connected by branch pipe 146 to propellant valve actuator 148. The actuator includes piston 150 which normally is loaded to the left by spring 152. The chamber at the left of the piston is connected to branch pipe 146 and the spring chamber at the right of the piston is connected to pipe 132. The piston is connected by rod 154 to diaphragm sealed butterfly valve 52 in oxidizer conduit 42 and also to diaphragm sealed butterfly valve 38 in fuel conduit 18. Valves 52 and 38 are similar in action to usual butterfly type valves, but are different in that a thin diaphragm of metal or Teflon-like material is clamped to the rim of the moving butterfly and between facing flanges 160 of the valve housing. The diaphragm acts as a leak-proof, positive seal when the valve is closed and before initial actuation of the valve. However, when the valve is to be opened the thin diaphragm is sheared by the initial movement of the butterfly rim.

Flanges 162 and 164 are included in pipe 58 immediately upstream of auxiliary propellant tanks 60 and 62, respectively. A non-metallic burst diaphragm is installed in the pipe at each of the flanges. These diaphragms are used to prevent the escape of auxiliary propellant and they are made of a material such as thin-sheet Teflon which will burst easily under the influence of helium pressure in pipe 58.

Figure 5:
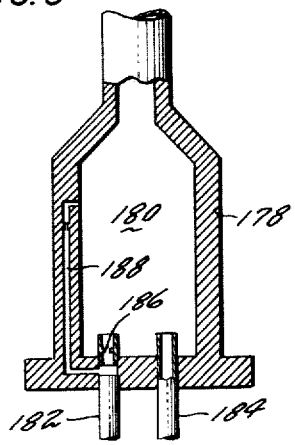
FIG. 5 is an enlarged section view of one of the gas generators.

Auxiliary oxidizer tank 60 is connected by pipe 166 to branch pipe 168 connecting gas generators 170 and 172, and auxiliary fuel tank 62 is connected by pipe 174 to branch pipe 176 also connecting the gas generators. The details of one of the gas generators are shown in FIG. 5, and include housing 178 defining chamber 180. Auxiliary propellant feed pipes 182 and 184 are attached to the upstream end of the housing, feed pipe 182 having fixed restriction 186 therein. One or more passages 188 branch off from feed pipe 182 upstream of the restriction for the introduction of excess propellant at a downstream point in the generator chamber. In the case of gas generator 170, oxidizer is fed to chamber 180 through branch pipe 168 and feed pipe 182 and fuel is fed through branch pipe 176 and feed pipe 184, with excess oxidizer being admitted to the chamber through passage 188. In the case of gas generator 172, fuel it fed through feed pipe 182 and oxidizer is fed through feed pipe 184, with excess fuel being admitted to the chamber through passage 188. The two propellants will mix in the chamber and burn.

Gas generator 170 is connected by pipe 190 to pressurizing inlet manifold 192 at the top of oxidizer tank 16 in propellant tank 10, the pipe extending upward through overflow pipe 194 within the oxidizer tank. The inlet manifold has a plurality of openings about its upper surface through which the gases from the generator are discharged into the oxidizer tank to pressurize it. Gas generator 172 is connected by pipe 196 to pressurizing inlet manifold 198 at the top of fuel tank 14, the nozzle ring having a plurality of openings about its upper surface through which gases from the gas generator are discharged into the tank to pressurize it. Pressure relief valve 200 is located at the lower end of overflow pipe 194 to prevent an excessive pressure build-up within oxidizer tank 16, and pressure relief valve 202 is provided at the top of tank 10 to prevent an excessive pressure build-up within fuel tank 14.

The flow of auxiliary oxidizer through branch pipe 168 to gas generator 170 is controlled solely by restriction 186 in the propellant feed pipe, while the flow of auxiliary fuel through branch pipe 176 to the gas generator is controlled by auxiliary tank pressure regulator 204. The quantity of auxiliary oxidizer flowing to the generator is relatively large with respect to the quantity of auxiliary fuel since it is desired to use up all of the auxiliary fuel flowing to this gas generator before the combustion gases are admitted to oxidizer tank 16.

Figure 6:
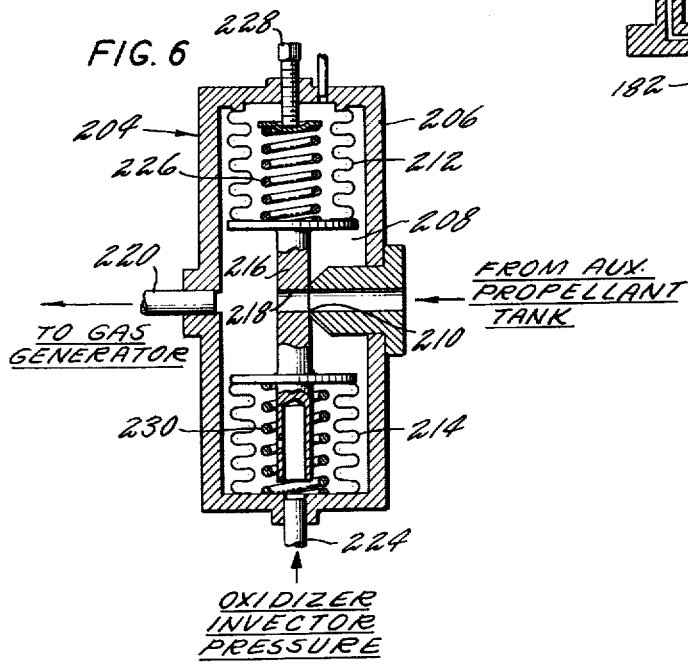
FIG. 6 is an enlarged section view of the auxiliary propellant tank pressure regulator.

Details of tank pressure regulator 204 are shown in FIG. 6. The regulator includes housing 206 defining chamber 208 therein. Auxiliary fuel from branch pipe 176 is admitted to chamber 208 through nozzle 210. A pair of opposed bellows 212 and 214 are mounted at opposite ends of the chamber and are connected by bar 216 having port 218 therein. The bar slides across the face of nozzle 210, having a slight clearance therewith, in response to the difference in pressure in the two bellows to vary the flow of fuel through nozzle 210 and port 218 into chamber 208. Metered auxiliary fuel flows from chamber 208 through pipe connection 220 to gas generator 170. The interior of bellows 212 is vented, while the interior of bellows 214 is connected to oxidizer conduit 42 downstream of butterfly valve 156 by line 222 and branch line 224. Spring 226 is contained within bellows 212, the loading of which may be varied by adjustment screw 228, and spring 230 is contained within bellows 214. The construction of the tank pressure regulator is such that there will be no rubbing friction and thus no hysteresis. More precise and predictable flow control, therefore, should be attainable.

The flow of auxiliary fuel through branch pipe 176 to gas generator 172 is controlled solely by restriction 186 in propellant feed pipe 182, while the flow of auxiliary oxidizer through branch pipe 168 and feed pipe 184 to the gas generator is controlled by tank pressure regulator 232. The quantity of auxiliary fuel flowing to the generator is relatively large with respect to the quantity of auxiliary oxidizer since it is desired to use up all of the auxiliary oxidizer flowing to this gas generator before the combustion gases are admitted to fuel tank 14.

Tank pressure regulator 232 is structurally the same as tank pressure regulator 204 shown in FIG. 6. Auxiliary oxidizer, however, is admitted to nozzle 210 and metered by the regulator rather than auxiliary fuel. Further, the interior of bellows 212 is connected to fuel conduit 18 immediately downstream of butterfly valve 158 rather than being vented. This connection is provided by line 234 as can be seen in FIG. 1.

Tank pressure regulator 204 operates in response to the thrust developed by the engine since the oxidizer conduit pressure to which bellows 214 is responsive varies in proportion to thrust. Tank pressure regulator 232, on the other hand, is responsive to an oxidizer-fuel ratio, its bellows being subject to oxidizer and fuel conduit pressures and being proportioned in area so as to respond to a given pressure ratio. Any error from the design ratio will cause corrective action to maintain the ratio constant.

Burst diaphragms 236 and 238 are used in auxiliary oxidizer branch pipe 168 to prevent the flow of auxiliary oxidizer to the propellant tanks. Burst diaphragms 240 and 242 are used in auxiliary fuel branch pipe 176 to prevent the flow of fuel to the propellant tanks. In addition, burst diaphragm 244 is used adjacent to burst diaphragm 240 so that a slug of fuel hypergolic with the auxiliary oxidizer can be placed in the branch pipe between diaphragms 240 and 244 when the propellant system is prepared for use. This slug is admitted to gas generator 170 when the engine is started and ignites spontaneously with the oxidizer to start combustion in the generator. Burst diaphragm 246 is used adjacent to burst diaphragm 242 so that a slug of fuel hypergolic with the auxiliary oxidizer can be placed in the branch pipe between diaphragms 240 and 246 for admission to gas generator 172 when the engine is started. This will start combustion in that gas generator.

To prepare the engine for storage and ultimate use an oxidizer supply is connected to oxidizer fill connection 50. Since butterfly valve 52 will be closed at this time and its diaphragm intact, the incoming oxidizer will fill conduit 42 above the valve as well as tank 16. When the level of the oxidizer in the tank reaches the top of overflow pipe 194 the excess oxidizer will flow through the pipe and out fill vent 248. At this time the oxidizer level in tank 16 will be established and fill connection 50 and fill vent 248 can be closed. Similarly a fuel supply is connected to fuel fill connection 36 and fuel pumped to tank 14. Butterfly valve 38 will be closed and its diaphragm intact. When the level of the fuel reaches the top of overflow pipe 250 the excess fuel will flow down through the pipe and out fill vent 252. At this time the fuel level in tank 14 will be established and fill connection 36 and fill vent 252 can be closed.

To purge propellant conduits 18 and 42 helium is admitted from propellant valve actuator 148 to lines 254 and 256. Line 254 is connected to oxidizer conduit 42 downstream of butterfly valve 52 and line 256 is connected to fuel conduit 18 downstream of butterfly valve 38.

*Operation of FIG. 1*

Start and running of the rocket engine is accomplished by an electrical start signal to circuit 70 which fires helium tank start squib valve 64, forcing piston 74 downward in cylinder 72. This provides a connection in pipe 58 across the squib valve. High pressure helium flows through pressure regulator 80 and through stop squib valve 116 to the burst diaphragms at flanges 162 and 164. The pressure of the helium ruptures the diaphragms and admits helium to auxiliary propellant tanks 60 and 62. Pressure fed auxiliary oxidizer from tank 60 bursts diaphragms 236 and 238 in branch pipe 168 immediately upstream of gas generators 170 and 172, respectively. Pressure fed auxiliary fuel from tank 62 bursts diaphragms 240 and 244 and 246 and 242 in branch pipe 176 connecting the gas generators. The oxidizer in branch pipe 168 and the hydrazine slugs contained between the burst diaphragms in branch pipe 176 are injected into the gas generators where the hypergolic action between them fires each gas generator to initiate combustion of the auxiliary propellants.

The start signal also admits pressure regulated helium to branch pipe 146 and propellant valve actuator 148 to open main propellant butterfly valves 38 and 52. As the butterfly valves start to open the sealing diaphragms at each of the valves 38 and 52 are ruptured and main propellants from tanks 14 and 16 are forced by gas generator combustion gas pressure to flow into combustion chamber 28, the fuel being preceded by the water which had been added to the fuel conduit downstream of butterfly valve 38 at the time the system was prepared for storage. Because of the greater length of path through cooling jacket 24 and the water in the system, fuel lags the arrival of oxidizer in each combustion chamber. The hypergolic ignition of the main propellants establishes combustion in the combustion chambers.

Thrust increases as the pressure in each of tanks 14 and 16 increases as the result of the combustion in generators 172 and 170, respectively. Auxiliary tank pressure regulators 204 and 232 regulate the auxiliary propellant flows to the gas generators to maintain a required pressure in each of the main propellant tanks.

Normal engine running is controlled by the mechanical and pneumatic systems of tank pressure regulators 204 and 232 to maintain a predetermined combustion chamber pressure, which is indicative of thrust, and to maintain the mixture ratio to each combustion chamber constant. The gas generator auxiliary propellant feed systems basically are calibrated orifices to supply oxidizer-rich combustion products to pressurize main oxidizer tank 16 and fuel-rich combustion products to pressurize main fuel tank 14.

For the main oxidizer tank, a constant auxiliary oxidizer flow is combined in gas generator 170 with an auxiliary fuel flow modulated by changes in the pressure in oxidizer conduit 42 sensed through line 222. The resultant gas generator products vary to give the oxidizer tank pressure required to keep the oxidizer conduit pressure constant. For the main fuel tank, a constant auxiliary fuel flow is combined in gas generator 172 with an auxiliary oxidizer flow modulated by changes in the ratio between the pressure in fuel conduit 18 sensed through line 234 and the pressure in oxidizer conduit 42 sensed through line 222. The resultant gas generator products vary to give the fuel tank pressure required to maintain a constant ratio between the propellant conduit pressures.

Thrust termination in flight occurs when the propellant tanks 14 or 16, or both, become empty. A ground abort or a test termination can be accomplished by an electrical signal to stop squib valve 116. The signal fires the propellant charge therein to force piston 126 downward in cylinder 124 and port high pressure helium from tank 56 through groove 128 in the piston to passage 142 and pipe 132 leading to the right side of piston 150 in propellant butterfly valve actuator 148. At the same time, the pressure in the chamber at the left side of actuator piston 150 is ported through passage 138 and groove 130 in piston 126 to vent 134. The pressure differential across actuator piston 150 will move it in a direction to close butterfly valves 38 and 52. The closing action of the actuator will admit helium from pipe 132 to lines 254 and 256 to purge the oxidizer and fuel conduits, respectively, downstream of the butterfly valve.

Figure 7:
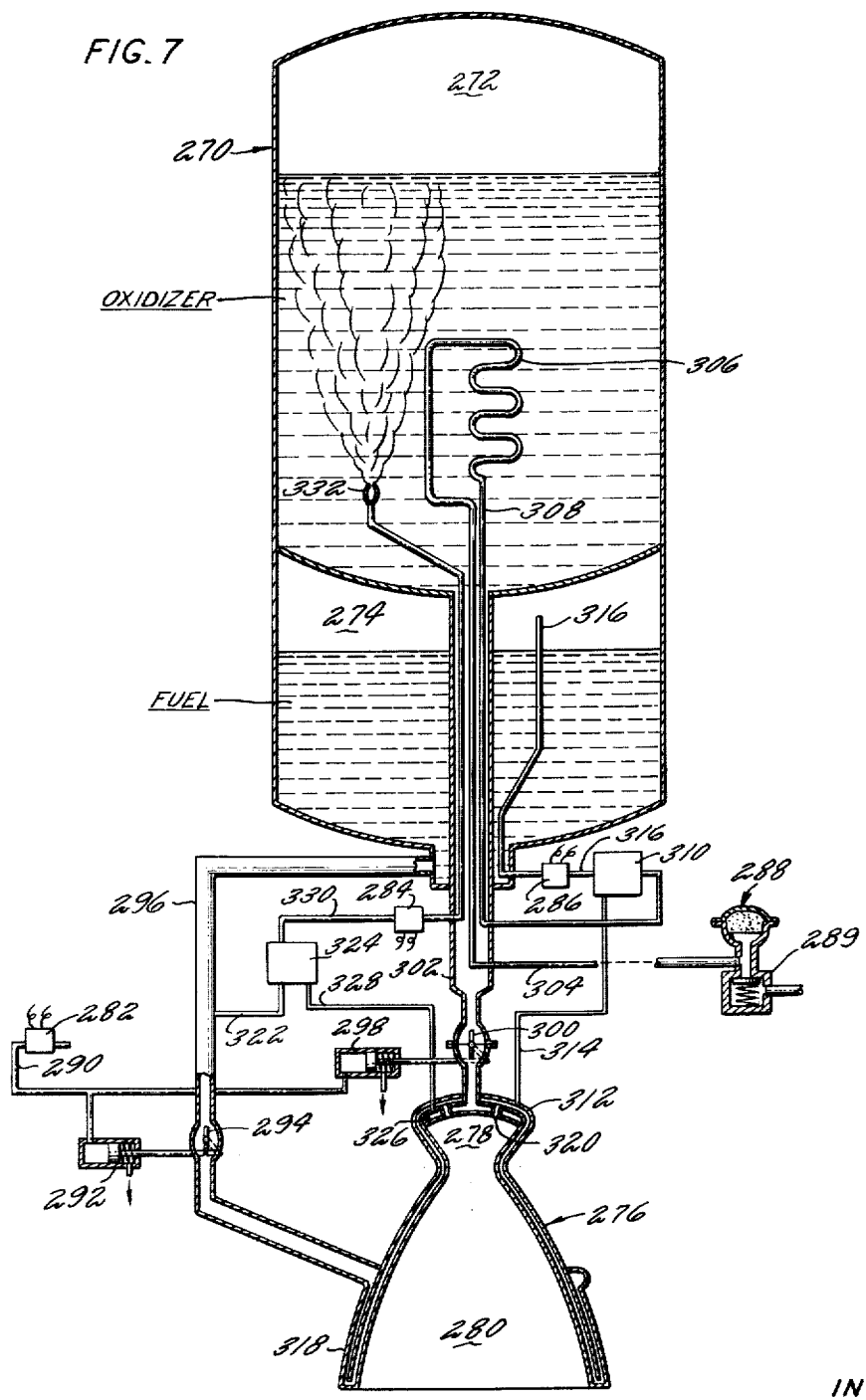
FIG. 7 is a schematic diagram of a modified propellant flow and control system.

*FIG. 7 System*

In the modified propellant flow and control system of FIG. 7, the rocket engine includes main propellant container 270 having oxidizer tank 272 and fuel tank 274 therein, and thrust chamber 276 defining combustion chamber 278 and thrust nozzle 280.

When the engine is to be started an electrical start signal is sent to squib valves 282, 284, and 286, and solid grain gas generator 288. Squib valve 282 is similar to squib valve 64 shown in FIG. 2, and controls the admission of a helium start signal through pipe 290 to actuator 292 for diaphragm sealed butterfly valve 294 in fuel conduit 296, and to actuator 298 for diaphragm sealed butterfly valve 300 in oxidizer conduit 302. Squib valves 284 and 286 also are similar to squib valve 64, providing a connection between two sections of a propellant feed pipe when actuated.

Solid grain gas generator 288 is of a slow burning type and is designed to produce gaseous products throughout flight of the rocket. The gaseous products from the gas generator flow through pipe 304 which extends upward through the interior of oxidizer conduit 302 to heat exchanger 306 submerged within oxidizer tank 272. From the heat exchanger the gaseous products flow in pipe 308 downward through oxidizer conduit 302 to fuel pressurizing control 310 which is similar to auxiliary tank pressure regulator 204 shown in FIG. 6. Fuel pressurizing control 310 regulates the flow of gaseous products from solid grain gas generator 288 in accordance with the pressure of the fuel in manifold 312 adjacent combustion chamber 278. This pressure is transmitted to the control through line 314. From the fuel pressurizing control the gaseous products enter pipe 316 to flow through squib valve 286 and into fuel tank 274. The gaseous products from solid grain gas generator 288 are cooled by passing them through the heat exchanger in the oxidizer tank so that after entering the fuel tank they will not heat the tank walls to an extent which would require much heavier walls—and a consequent greater weight. Fuel pressurizing control 310 establishes a desired injector fuel pressure at the combustion chamber. Any excess of gaseous products from the solid grain gas generator are vented overboard through relief valve 289.

Fuel from tank 274 flows through conduit 296 and past butterfly valve 294 to cooling jacket 318 surrounding thrust chamber 276. From the jacket the fuel flows into manifold 312 and it is then injected into combustion chamber 278 through a plurality of jets 320.

Oxidizer tank 272 is pressurized during running of the engine by flowing a small stream of fuel directly into the oxidizer tank where the fuel and oxidizer burn hypergolically. The pressure level of the fuel is higher than the pressure level of the oxidizer and a small quantity of the fuel is ducted through pipe 322 to oxidizer pressurizing control 324 which also is similar to tank pressure regulator 204 shown in FIG. 6.

Oxidizer pressurizing control 324 regulates fuel flow in accordance with the pressure of the oxidizer in manifold 326 adjacent combustion chamber 278. This pressure is transmitted to the control through line 328. From the oxidizer pressurizing control the fuel enters pipe 330 to flow through squib valve 284. Pipe 330 then runs upward through oxidizer conduit 302 to burner 332 within the oxidizer tank. The products of combustion resulting from the mixture of fuel and oxidizer in burner 332 are cooled somewhat by passage through the liquid oxidizer to its upper surface. Here, again, the purpose of cooling the combustion products is to protect the oxidizer tank from overheating. The flow of fuel burned in the oxidizer tank is regulated by oxidizer pressurizing control 324 to a rate which produces oxidizer tank pressurization giving the desired oxidizer injection pressure at combustion chamber 278. Oxidizer from tank 272 flows through conduit 302 and past butterfly valve 300 to manifold 326 from which it is injected into the combustion chamber through openings surrounding fuel jets 320.

It is to be understood that the invention is not limited to the specific embodiments herein illustrated and described, but may be used in other ways without departure from its spirit as defined by the following claims.

I claim:

1. A rocket engine propellant flow and control system including a fuel tank, an oxidizer tank, a plurality of thrust chambers, conduit means connecting each of said tanks to each of said thrust chambers, diaphragm sealed butterfly valves in each of said conduit means, actuator means for said valves, an auxiliary fuel tank, an auxiliary oxidizer tank, helium tank means, pipe means for operating said actuator means and for pressurizing said auxiliary tanks with helium from said helium tank means, squib valve means in said pipe means for admitting helium to said pipe means, means for regulating the helium pressure in said pipe means, squib valve means in said pipe means controlling the admission of helium to said actuator means, a first gas generator connected to said fuel tank, means for applying propellants from said auxiliary tanks to said first gas generator, second gas generator connected to said oxidizer tank, and means for supplying propellants from said auxiliary tanks to said second gas generator.

2. A rocket engine propellant flow and control system including a fuel tank, an oxidizer tank, a plurality of thrust chambers, conduit means connecting each of said tanks to each of said thrust chambers, diaphragm sealed butterfly valves in each of said conduit means, actuator means for said valves, an auxiliary fuel tank, an auxiliary oxidizer tank, helium tank means, pipe means for operating said actuator means and for pressurizing said auxiliary tanks with helium from said helium tank means, squib valve means in said pipe means for admitting helium to said pipe means, means for regulating the helium pressure in said pipe means, squib valve means in said pipe means controlling the admission of helium to said actuator means, a first gas generator connected to said fuel tank, a second gas generator connected to said oxidizer tank, means for supplying auxiliary oxidizer to said gas generator, means for supplying auxiliary fuel to said gas generators, and means in said auxiliary fuel supplying means for supplying a slug of fuel hypergolic with said oxidizer to said gas generators when said engine is started.

3. A rocket engine propellant flow and control system including a fuel tank, an oxidizer tank, a plurality of thrust chambers, conduit means connecting each of said tanks to each of said thrust chambers, the fuel conduit means including a jacket surrounding at least a portion of each of said thrust chambers, diaphragm sealed butterfly valves in each of said conduit means, actuator means for said valves, an auxiliary fuel tank, an auxiliary oxidizer tank, helium tank means, pipe means for operating said actuator means and for pressurizing said auxiliary tanks with helium from said helium tank means, squib valve means in said pipe means for admitting helium to said pipe means, means for regulating the helium pressure in said pipe means, squib valve means in said pipe means controlling the admission of helium to said actuator means, a first gas generator connected to said fuel tank, means for supplying propellant from said auxiliary tanks to said first gas generator, second gas generator connected to said oxidizer tank, and means for supplying propellants from said auxiliary tanks to said second gas generator.

4. A rocket engine propellant flow and control system including a first tank having a supply of fuel therein, a second tank having a supply of oxidizer therein, at least one thrust chamber, conduit means connecting each of said tanks to said thrust chamber, valve means in each of said conduit means, actuator means for said valve means, means for operating said actuator means, first means for pressurizing the oxidizer supply, means responsive to the pressure in the oxidizer conduit intermediate the valve means therein and said thrust chamber for regulating said first pressurizing means to maintain a predetermined pressure level in the oxidizer conduit to maintain a predetermined combustion chamber pressure and a predetermined rocket engine thrust, and mens responsive to the pressures in the oxidizer conduit and the fuel conduit intermediate the valve means in each conduit and said thrust chamber to maintain a predetermined ratio between the pressure levels in the conduits to maintain a predetermined fuel-oxidizer ratio in said thrust chamber.

References Cited in the file of this patent

UNITED STATES PATENTS

| | | |
|---|---|---|
| 2,406,926 | Summerfield | Sept. 3, 1946 |
| 2,408,111 | Truax et al. | Sept. 24, 1946 |
| 2,671,312 | Roy | Mar. 9, 1954 |
| 2,738,648 | Ogle | Mar. 20, 1956 |
| 2,743,577 | Malick | May 1, 1956 |
| 2,816,417 | Bloomberg | Dec. 17, 1957 |
| 2,880,582 | Turansky | Apr. 7, 1959 |
| 2,940,256 | Conyers | June 14, 1960 |

UNITED STATES PATENT OFFICE
CERTIFICATE OF CORRECTION

Patent No. 3,102,388 September 3, 1963

Robert N. Abild

It is hereby certified that error appears in the above numbered patent requiring correction and that the said Letters Patent should read as corrected below.

Column 8, line 71, for "generator" read -- generators --; column 10, line 8, for "mens" read -- means --.

Signed and sealed this 25th day of February 1964.

(SEAL)
Attest:
ERNEST W. SWIDER

EDWIN L. REYNOLDS

Attesting Officer

Acting Commissioner of Patents